United States Patent
Ferri et al.

(10) Patent No.: US 8,788,808 B2
(45) Date of Patent: *Jul. 22, 2014

(54) AUTHENTICATING DIGITALLY ENCODED PRODUCTS WITHOUT PRIVATE KEY SHARING

(75) Inventors: Luca Ferri, Rome (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/477,854

(22) Filed: May 22, 2012

(65) Prior Publication Data

US 2012/0278612 A1 Nov. 1, 2012

Related U.S. Application Data

(63) Continuation of application No. 10/718,064, filed on Nov. 20, 2003, now Pat. No. 8,219,801.

(51) Int. Cl.
*H04L 9/00* (2006.01)

(52) U.S. Cl.
USPC .......................................................... 713/155

(58) Field of Classification Search
USPC .............................. 713/155, 156, 175; 726/22
See application file for complete search history.

(56) References Cited

U.S. PATENT DOCUMENTS

| | | | |
|---|---|---|---|
| 6,223,291 B1 * | 4/2001 | Puhl et al. ........................ | 726/28 |
| 6,367,012 B1 | 4/2002 | Atkinson et al. | |
| 6,766,454 B1 * | 7/2004 | Riggins ......................... | 713/185 |
| 7,024,689 B2 | 4/2006 | O'Donnell et al. | |
| 7,140,036 B2 | 11/2006 | Bhagavatula et al. | |
| 2003/0046589 A1 * | 3/2003 | Gregg ........................... | 713/201 |
| 2004/0049699 A1 * | 3/2004 | Griffith et al. ................ | 713/201 |
| 2004/0177047 A1 | 9/2004 | Graves et al. | |
| 2004/0181672 A1 | 9/2004 | Ferri et al. | |

OTHER PUBLICATIONS

U.S. Appl. No. 10/718,064.

* cited by examiner

*Primary Examiner* — Ellen Tran
(74) *Attorney, Agent, or Firm* — Francis Lammes; Stephen J. Walder, Jr.; John D. Flynn

(57) ABSTRACT

A method and a corresponding system for authenticating software products are proposed. A digital certificate and a corresponding private key required to sign each product are stored on a server computer. Whenever a user needs to sign a product, he/she logs on a client computer and transmits a corresponding request to the server computer. The server computer verifies whether the request has been received from an authorized subject; for example, an address of the client computer and an identifier of the user are compared with a predefined list. If the result of the verification is positive, the product is signed and returned to the client computer. For this purpose, a script called on the server computer includes either an instruction passing the access password to a signing tool as a parameter or an instruction causing the signing tool to import the access password from a registry of the server computer.

14 Claims, 5 Drawing Sheets

AUTHENTICATING DIGITALLY ENCODED PRODUCTS WITHOUT PRIVATE KEY SHARING

TECHNICAL FIELD

The present invention relates to the data processing field, and more specifically to a method and a corresponding system for authenticating digitally encoded products.

BACKGROUND ART

Authentication of digital encoded products (such as software programs) is commonplace in modern data processing infrastructures. The authentication process is used to certify the identity of an entity from which any product is received. The need of authenticated products is particularly acute in environments (typically based on the Internet) that are open and then allow aft uncontrolled access thereto. For example, a software distribution application requires the authentication of any applet used to perform the operations needed for installing the desired software products on target computers; in this way, the origin of the applet can be verified (by a user of the target computer) before authorizing the execution of potentially dangerous operations.

Generally, the authentication process involves the generation of a digital signature using a private key; a trusted certification authority guarantees the identity of the owner of the private key by means of a corresponding digital certificate. In order to increase security of the authentication process, the private key is commonly encrypted and protected by a password that must be typed during a signing procedure. The owner of the private key must take all the precautions required to prevent any loss or disclosure of the password, which can result in an unauthorized and malicious use of the private key (for example, with the distribution of harmful code by a hacker pretending to be the owner of the private key).

However, in many practical situations access to the private key must be granted to several persons; for example, a typical scenario is the authentication of the software products that are routinely delivered by different teams of a software development laboratory in a large corporation. In the above-mentioned situations, it is unavoidable to share the password for accessing the private key among a high number of persons. However, this uncontrolled dissemination of sensitive information can jeopardize the security of the authentication process. Particularly, the risk of misuse of the private key is strongly increased; moreover, the actual use of the private key by the different persons cannot be tracked in any way.

At the same time, the control of the accesses to the private key is very critical. In fact, the revocation of an authorization granted to a specific person involves the generation of a new access password and its distribution to all the (still authorized) persons. For example, this process must be performed whenever a person has been transferred to a different department or has left the company. However, the operations described above are very complex, time consuming and prone to security breach.

Vice-versa, limiting the access to the private key involves the need of having multiple digital certificates with corresponding private keys (for example, one for every team). However, this approach is detrimental to the corporate image on the marketplace; moreover, it increases the costs of buying and renewing the different digital certificates. The security problems are also exacerbated by the proliferation of the sensitive information to be protected.

An additional drawback is due to the fact that the signing procedure requires the typing of the access password for each product to be authenticated. As a consequence, the authentication process cannot be unattended.

Alternative approaches supported by the signing tools known in the art are not tenable. For example, some signing tools support a command line interface that allows passing the access password as a parameter; in this case, the access password can be inserted in an instruction of a script calling the signing tool. Different signing tools make it possible to import the private key from a configuration registry. However, those solutions are unacceptable, because they would involve the dissemination of the private key without any control.

SUMMARY OF THE INVENTION

It is an object of the present invention to provide a method and a corresponding system for authenticating digitally encoded products that do not require the sharing of sensitive information used to certify the origin of the products.

It is another object of the present invention to increase the security of the authentication process, so as to reduce the risks of any misuse of the sensitive information.

It is yet another object of the present invention to allow tracking the actual use of the sensitive information by different authorized users.

Moreover, it is an object of the present invention to centralize the control of the authentication process.

It is another object of the present invention to restrict the access to the sensitive information, without requiring its proliferation.

It is yet another object of the present invention to support an unattended authentication process.

The accomplishment of these and other related objects is achieved by a method of authenticating a digitally encoded product being originated by an entity having at least one authorized subject, the method including the steps of: a client system transmitting a request of authentication of the product to a server system, the server system verifying whether the request is received from an authorized subject, and responsive to a positive verification certifying that the product originates from the entity using sensitive information of the entity stored on the server system, and returning a representation of the certification to the client system.

The present invention also provides a computer program application for performing the method, and corresponding computer programs running on the client system and on the server system, respectively; program products storing these computer programs are also encompassed.

Moreover, the invention provides a structure for implementing the method; a client system and a server system for use in the structure are also included.

The novel features believed to be characteristic of this invention are set forth in the appended claims. The invention itself, however, as well as these and other related objects and advantages thereof, will be best understood by reference to the following detailed description to be read in conjunction with the accompanying drawings.

DETAILED DESCRIPTION OF THE PREFERRED EMBODIMENT

Figure 1A:
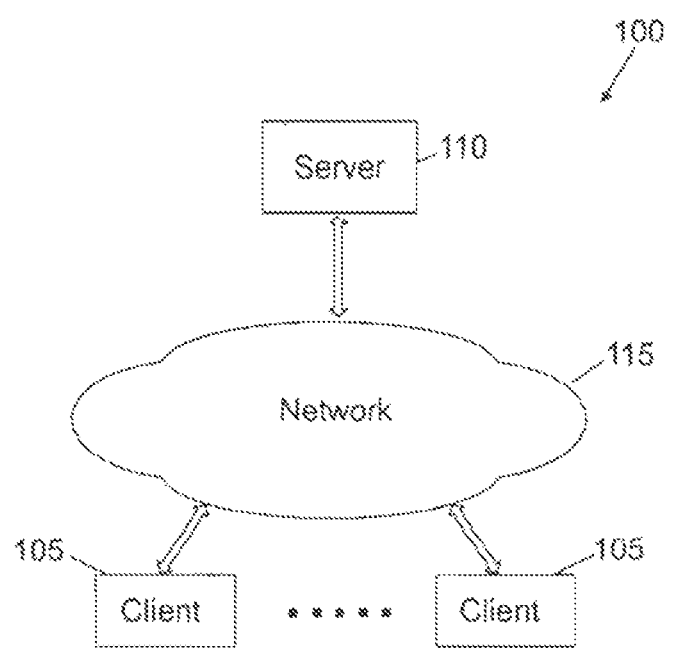
FIG. 1a is a schematic block diagram of a data processing infrastructure in which the method of the invention is applicable.

With reference in particular to FIG. 1a, a distributed data processing infrastructure 100 is shown. The structure 100 implements an automated environment for building packages in a software distribution application. Each software package embeds a copy of one or more products to be installed on target computers (not shown in the figure). The software package can include one or more applets (for example, written in the Java language); each applet consists of a small program designed to run only from within another application (and not directly from an operating system), such as from within a web browser equipped with a Java Virtual Machine.

The applet must be classified as "trusted", in order to be authorized to perform the operations required by the software distribution application (for example, open network connections, read system information, update files or run executables). In fact, regular applets are executed by default in a controlled environment (referred to as a "sandbox"), wherein potentially dangerous operations are denied. Conversely, a trusted applet is given special privileges that allow performing those operations. In order to be classified as trusted, the applet must be authenticated; in this way, a user of the target computer is guaranteed of the origin of the applet when prompted to grant the special privileges.

For this purpose, the structure 100 includes several client computers 105, which are responsible to build the software packages to be distributed; a user can log on each client computer 105 specifying his/her user identifier (userID) and a personal password. A server computer 110 is dedicated to authenticate the applets associated with different software packages; access to the server computer 110 is restricted to one or more system administrators (by means of corresponding passwords). The client computers 105 and the server computer 110 are coupled through a network 115; the network 115 consists of a trusted structure, such as a private Local Area Network (LAN) of a software development laboratory.

The authentication of the applets is based on a Public Key Infrastructure (PKI). The PKI leverages an asymmetric encryption technique involving the use of a (non-confidential) public key and a (confidential) private key. One of the keys (either the public one or the private one) is used to encrypt an original message (i.e., to transform the original message in an apparently unintelligible form); the other key is used to decipher the encrypted message in order to obtain the original message. The keys are generated so that it is computationally unfeasible to obtain the private key from the public key.

A Certification Authority (CA) guarantees the identity of the owner of the pair of keys (the development laboratory in the example at issue) by means of a corresponding digital certificate. The digital certificate includes information identifying the owner (such as name, address, and the like), his/her public key, and the name of the certification authority. The digital certificate is digitally signed by the certification authority.

The digital signature of a message is created generating a hash value of the message. The hash value consists of a pre-set number of bits, lower than the one required to encode the message directly; nevertheless, the hash value is substantially unique for the message (that is, any change in the message generates a different hash value). The hash value is obtained using a one-way function, so that it is computationally unfeasible to obtain the message from the hash value. The digital signature is then created by encrypting the hash value with the private key of a sender. A receiver of the (signed) message can validate the same simply generating the hash value of the message and comparing this hash value with the one extracted from the digital signature using the public key of the sender. In this way, the receiver verifies that the original message has not been corrupted (integrity) and that it has been actually sent by the entity identified in the digital certificate (authenticity).

Therefore, the digital certificate issued by the certification authority guarantees that the owner of the private/public keys pair is actually the entity identified in the digital certificate. The identity of the certification authority is in turn guaranteed by an upper level certification authority, up to a main certification authority generally trusted.

In the present application, any applet is authenticated by the development laboratory generating a digital signature thereof using the respective private key. The digital signature and the digital certificate of the development laboratory are then attached to the software package. Therefore, the user of any target computer can verify that the applet has been actually delivered by the development laboratory (identified in the digital certificate).

However, the concepts of the present invention are also applicable when the structure has another architecture, when a single client computer or two or more server computers are envisaged, or when the access to each client and server computer is controlled in another way (for example, using a hardware key). Similar considerations apply if the software packages are authenticated with a different technique, or if the structure is used in another application; for example, the solution of the invention can be exploited by a generic entity to authenticate equivalent program code, software drivers, license certificates, or more generally to authenticate any digitally encoded product.

Figure 1B:
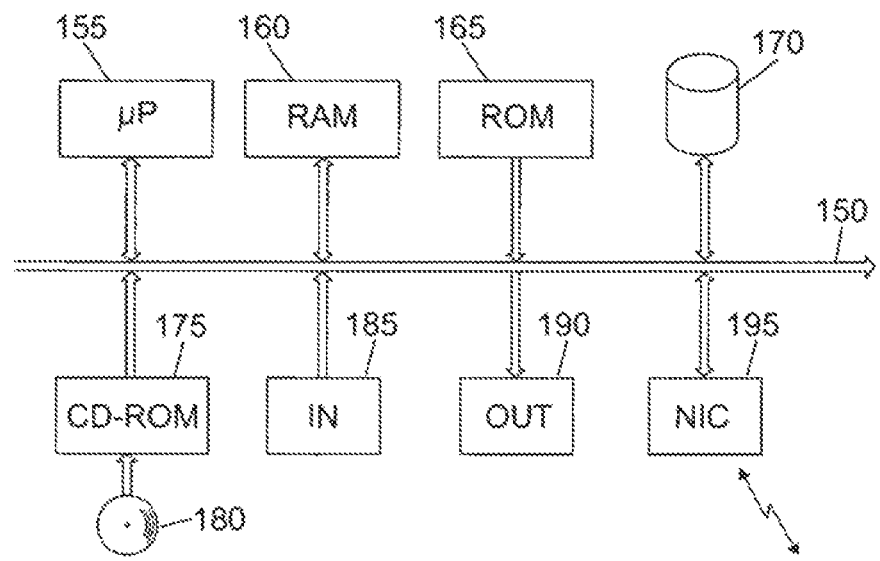
FIG. 1b shows the functional blocks of a generic computer of the system.

A shown in FIG. 1b, a generic computer of the structure (client or server) is formed by several units that are connected in parallel to a communication bus 150. In detail, a microprocessor (μP) 155 controls operation of the computer, a (Random Access Memory) RAM 160 is directly used as a working memory by the microprocessor 155, and a Read Only Memory (ROM) 165 stores basic code for a bootstrap of the computer. Several peripheral units are further connected to the bus 150 (by means of respective interfaces). Particularly, a mass memory consists of a magnetic hard-disk 170 and a driver 175 for reading CD-ROMs 180. Moreover, the computer includes input devices 185 (for example, a keyboard and a mouse), and output devices 190 (for example, a monitor and a printer). A network Interface Card (NIC) 195 is used to connect the computer in the network.

However, the concepts of the present invention are also applicable when the (client and/or server) computers have a different structure or include other units. Similar considerations apply if the computers are replaced with equivalent logic and/or physic systems; for example, each computer can consist of a virtual machine or can be implemented with two or more distinct machines (such as a front-end and a back-end).

Figure 2:
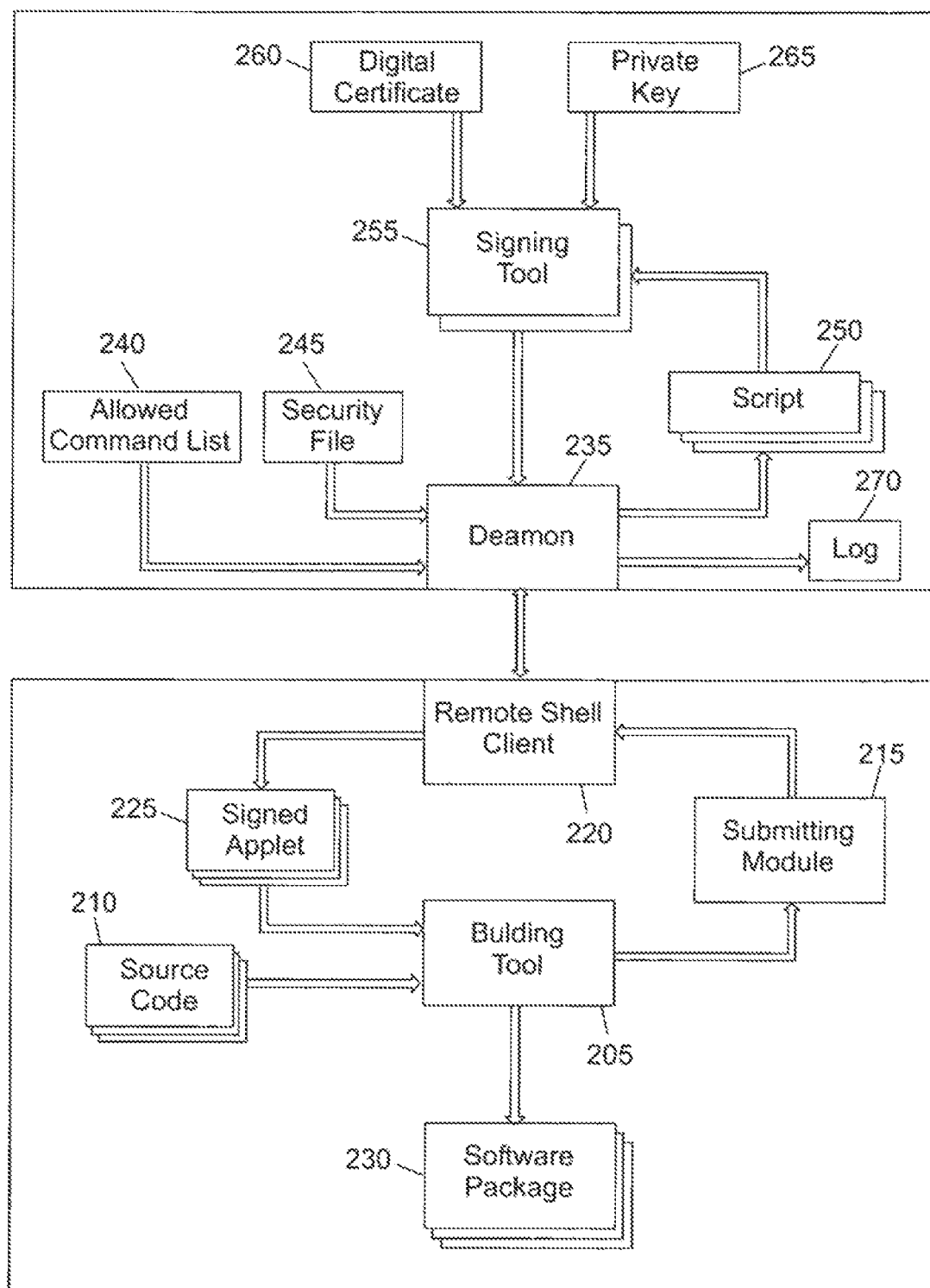
FIG. 2 depicts the main software components used to implement the method.

Considering now FIG. 2, the main software components used in the structure described above are illustrated. The information (programs and data) is typically stored on the hard-disks of the client and server computers; the information is loaded (at least partially) into the respective working memories when the programs are running, together with the operating systems and other application programs (not shown in the figure). The programs are initially installed onto the hard-disks from CD-ROMs.

Particularly, a building tool 205 (typically including a compiler, a linker, and so on) is installed on each client computer. The building tool 205 accesses a source code repository 210 storing software products, instructions and applets to be distributed to the target computers. The building tool 205 further controls a module 215, which is used to submit requests of authentication of specific applets to the server computer. For this purpose, the submitting module 215 interfaces with the client component 220 of a remote shell (RSH or REMSH); the remote shell client 220 allows invoking remote commands on the server computer (passing input parameters and receiving output results directly). As described in detail in the following, the remote commands invoked on the server computer return corresponding signed applets 225 to the client computer. The building tool 205 transforms the source code stored in the repository 210 into executables, which are then bundled (together with the signed applets 225) so as to generate software packages 230 (that are provided to the target computers).

Moving now to the server computer, an RSH daemon 235 cooperates with the remote shell client 220; the daemon 235 consists of a program that cannot be invoked explicitly, but runs in the background waiting for some conditions to occur. The daemon 235 implements several security features. In detail, all the Remote Copy (CRP) services are disabled; in this way, the downloading of sensitive information from or the uploading of harmful code to the server computer are prevented. Moreover, the daemon 235 accesses an allowed command list 240 and a security file 245.

The list 240 specifies the remote commands that can be executed by the daemon 235; typically, the allowed command list 240 includes one or more remote commands for satisfying different requests of authentication from the client computers and an additional remote command for verifying that the server computer has been properly configured to allow a specific client computer to connect.

On the other hand, the security file 245 specifies the client computers and the users that are authorized to request the authentication of applets to the server computer; for example, each authorized subject is identified by a user identifier followed by an address of the client computer where the user is logged on.

Each remote command that can be invoked on the server computer (specified in the allowed command list 240) consists of a script 250, which is called by the daemon 235. The scripts 250 interface with different signing tools 255 (for example, a script SCRa for the Signtool of Netscape and a script SCRb for the Authenticode of Microsoft). All the signing tools 255 access a digital certificate 260 and a corresponding private key 265; the private key is protected by an access password (only known to the system administrator). Each tool 255 digitally signs the applets received from the client computers; the signed applets are returned to the client computers through the daemon 235. The daemon 235 further controls the storing of information relating to the received requests in a log 270 (for example, date and time, user, client computer, remote command, security exceptions, error messages, and the like).

However, the concepts of the present invention are also applicable when the authorized addresses and the authorized users are not-correlated to each other, when the security file is replaced with equivalent information indicating the authorized subjects, or when a different number of scripts are supported (down to a single one); alternatively, only the private key is stored on the server computer, or multiple digital certificates with the corresponding private keys are available (for example, for different companies of a holding). Similar considerations apply if the whole application (programs on the client computer and on the server computer) and the corresponding data are structured in a different manner, if other modules or functions are provided, and the like.

Figure 3A:
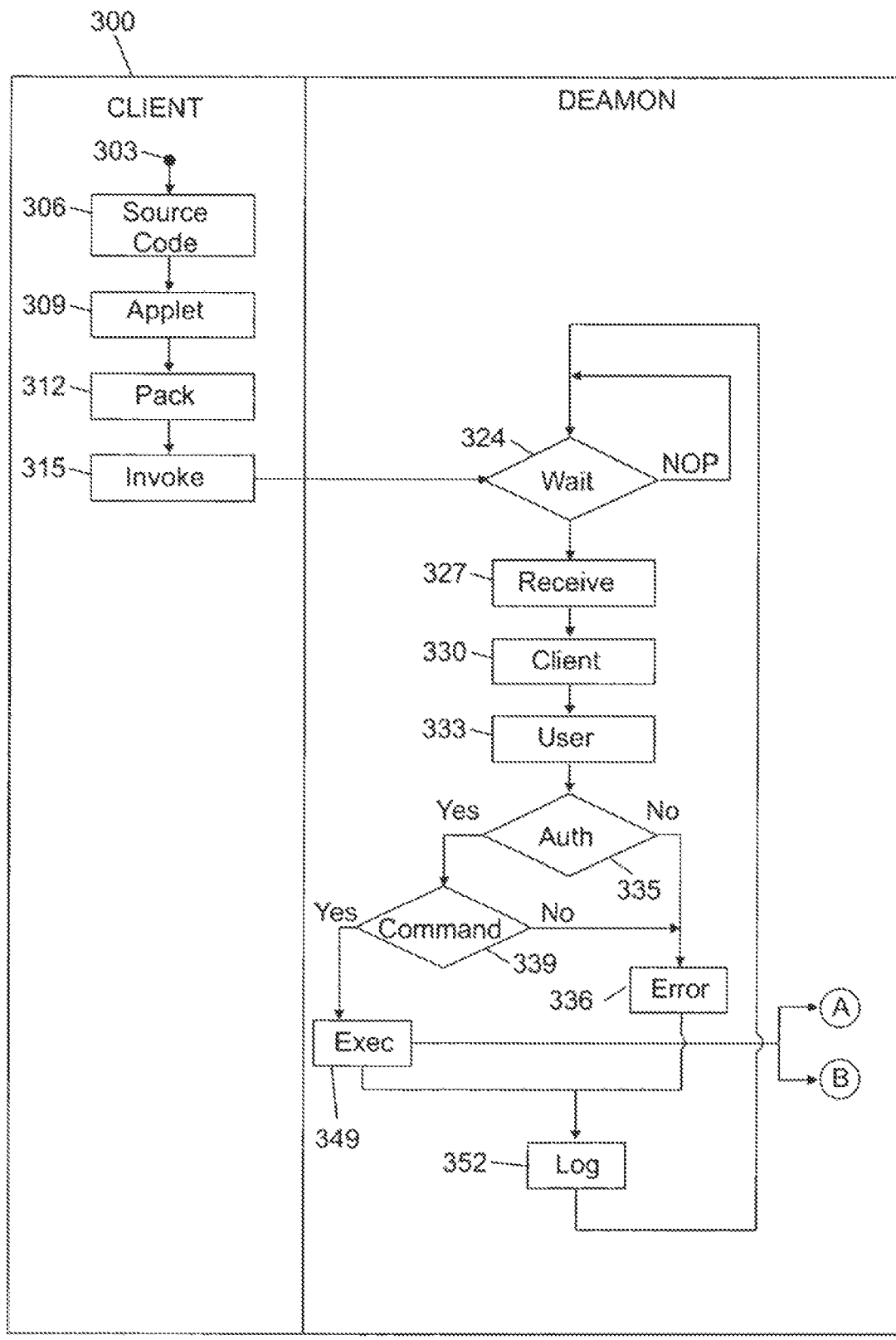
FIGS. 3a-3b illustrate an activity diagram describing the logic flow of the method.
Figure 3B:
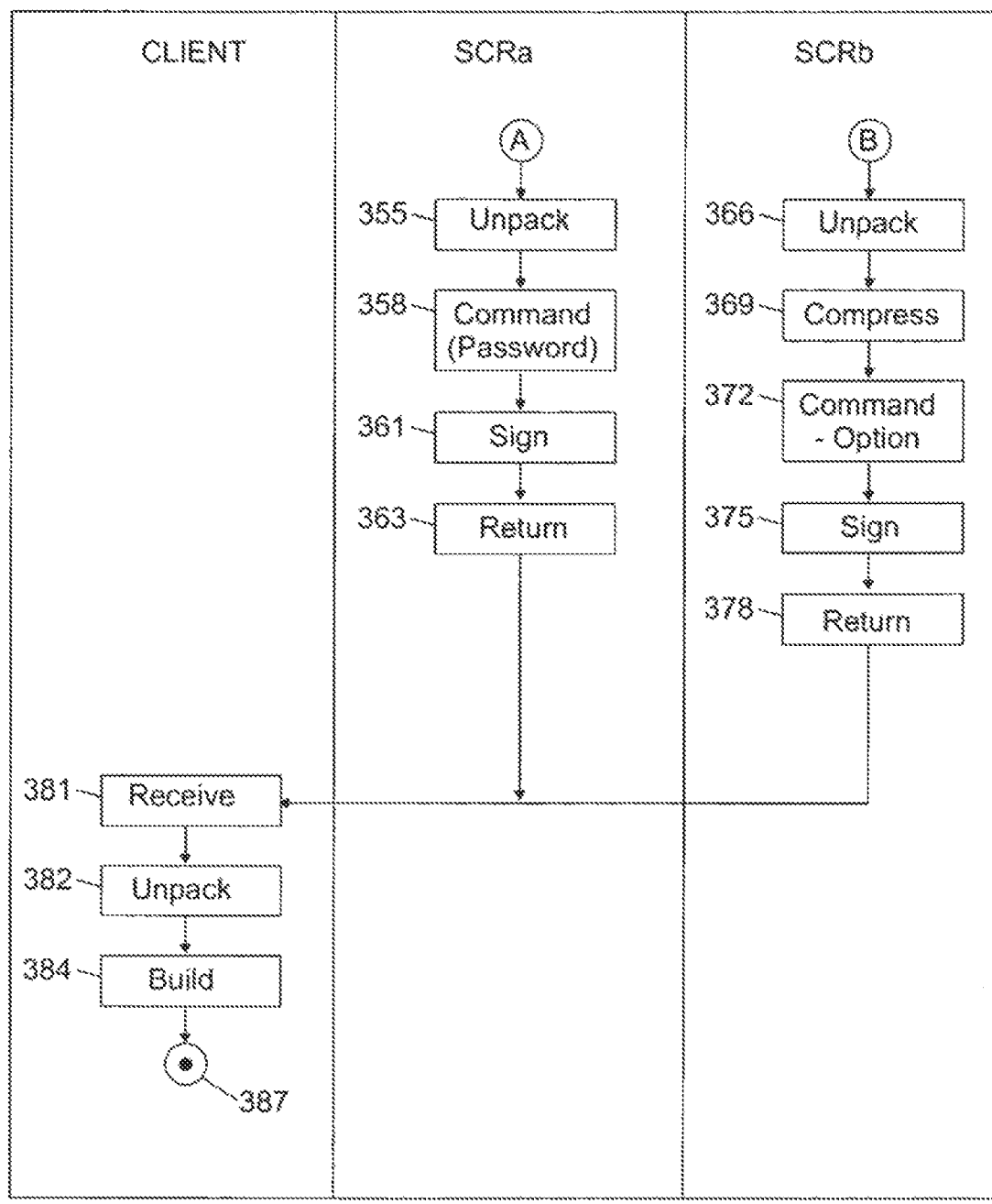

Moving now to FIGS. 3a-3b, an activity diagram describing the logic of a method 300 that implements a process of building a software package is illustrated. The process begins at the black start circle 303 in the swim-lane of a generic client computer. The source code to be distributed is selected at block 306 (from the corresponding repository). Passing to block 309, the files defining the associated applet intended to be executed on each target computer are extracted from the source code repository. The method continues to block 312, wherein the files of the applet are compiled and packed in an archive, typically consisting of a file conforming to the tar (Tape ARchive) format. Descending into block 315, a request of authentication of the applet is submitted to the server computer. For this purpose, the tar file is sent to a standard input channel (stdin) of the remote shell client; the desired remote command is then invoked on the server computer (through the remote shell client).

The deamon running on the server computer is in a wait state at block 324 (in the respective swim-lane). As soon as the remote command is received, the process descends into block 327, wherein the deamon retrieves the tar file passed by the remote shell client. The address of the client computer from which the remote command has been invoked is detected at block 330. Likewise, the identifier of the user logged on the client computer is detected at block 333. The process then verifies at block 335 whether the pair "address-user" identifies a subject authorized to invoke remote commands on the server computer (i.e., the pair is included in the security file). If not, the process enters an error condition at block 336. Conversely, a test is made at block 339 to determine whether the remote command is included in the allowed command list. If the result of the verification is negative, the process enters the error block 336. On the contrary, when all the security conditions are met the script corresponding to the remote command is called at block 349 (passing the tar file received from the client computer).

In any case, the process continues to block 352 (either from block 336 or from block 349), wherein the information relating to the operations described above is logged on the server computer. The flow of activities then returns to block 324, waiting for a next remote command.

Referring back to block 349, if the script called by the remote command is SCRa (for the Signtool of Netscape) the blocks 355-363 are executed, whereas if the script is SCRb (for the Authenticode of Microsoft) the blocks 366-378 are executed.

Moving to the swim-lane of the script SCRa, the tar file received from the client computer is unpacked at block 355. The code of the script SCRa includes an instruction for causing the executing of a signing command by the corresponding tool. The location of the files to be signed, the location of the digital certificate and of the private key, an identifier of the digital certificate, and the password for accessing the private key are passed to the signing tool as parameters; the script SCRa is protected, so that only the administrator can read its content (including the password for accessing the private key). In response thereto, the applet is signed at block 361 by the corresponding tool. The result of this operation is a compressed archive, typically consisting of a file conforming to the jar (Java ARchive) format; the jar file includes the (original) applet, the digital certificate and the digital signature of the applet. The flow of activities continues to block 363, wherein the signed applet is returned to the client computer (with the script SCRa that ends its execution). For this purpose, the signed applet is packed (into a tar file) and then sent to a standard output channel (stdout) of the remote shell client. During the whole activity described above (corresponding to the execution of the script SCRa), messages denoting the progress of the different operations are echoed to the client computer using a standard error channel (stderr).

Similar operations are executed by the script SCRb. Particularly, the tar file received from the client computer is unpacked at block 366 (in the corresponding swim-lane). Proceeding to block 369, the files to be signed are compressed into a single file, typically conforming to the cab (CABinet) format. The code of the script SCRb then includes an instruction for causing the executing of a signing command by the corresponding tool. The name of the cab file to be signed is passed to the signing tool as a parameter; moreover, the signing command is called specifying an option (–cn) that instructs the signing tool to import the digital certificate and the private key from a registry of the server computer. The registry consists of an archive storing configuration information. The digital certificate and the private key are included in a private section of the registry, which access is restricted to the administrator; the information is imported into the registry during a configuration process of the server computer (with the password for accessing the private key that is required only once during the import step). The applet is then signed at block 375 by the corresponding tool. The process continues to block 378, wherein the resulting signed applet is packed into a tar file and returned to the client computer (with the script SCRb that ends its execution).

Returning now to the swim-lane of the client computer, the remote shell client at block 381 receives the tar file (generated by either the script SCRa or the script SCRb). The flow of activities continues to block 382, wherein the tar file is unpacked and made available to the building tool. The process can now be completed at block 384 with the generation of the desired software package. The method then ends at the concentric white/black stop circles 387.

In the process described above, whenever a new software package must be shipped a user logs on a specific client computer configured as a building machine; the users authorized to do so and the client computers that they can use are predefined in the security file stored on the server computer. The user can now configure the building tool as desired and then run the corresponding process. The building process is completely unattended. In fact, the user only authenticates to the client computer (entering his/her identifier and, the personal password) during a log-on procedure. Afterwards, any applet is digitally signed by the server computer (which automatically retrieves the private key stored thereon) without requiring any manual intervention.

In addition, the authorizations for requesting the authentication of products can be controlled centrally by the administrator in a very simple manner. Particularly, the granting or the revoking of an authorization (either to a user or to a client computer) is performed simply updating the security file stored on the server computer. In any case, once the access to the authorized client computers has been denied to a user and/or the respective userID has been deleted, that user cannot request the authentication of products to the server computer any longer. The security is further increased by the fact that the authorized users never have direct access to the password for accessing the private key; therefore, no sensitive information can be acquired by the users while authorized to run the building process.

However, the concepts of the present invention are also applicable when different signing tools are supported (for example, the JDK of Sun), when only the private key is imported from the registry, or when the digital certificate and/or the private key are loaded in another private configuration memory area of the server computer. Similar considerations apply if an equivalent method is implemented, if different file formats are used, and the like.

Alternatively, the method of the invention is used in a data processing infrastructure based on an untrusted network, such as the Internet. A suggested choice for implementing the method is to use the HyperText Transfer Protocol Secure (HTTPS) standard. In this way, the information transmitted over the Internet is encrypted; moreover, each user logged on a client computer authenticates to the server computer using a corresponding digital certificate. The signing procedure is then very similar to the one described above. In detail, the client computer transmits the request of authentication through a POST method; the corresponding response will include the signed applet (in a body) and information relating to the executed operations (in a header). On the server side, a Servlet engine or a CGI infrastructure performs all the operations required to manage the signing procedure.

For example, the alternative embodiment of the invention described above can be used by distributed development laboratories interacting with a single remote server computer. Moreover, the server computer can also be managed by an external company operating as a service provider for several clients (for example, implementing a "pay-per-use" policy).

More generally, the present invention proposes a method of authenticating a digitally encoded product; the product has been originated by an entity having one or more authorized subjects. In the method of the invention, a client system transmits a request of authentication of the product to a server system. The server system verifies whether the request is received from an authorized subject. The following steps are executed in response to a positive verification. First of all, the server system certifies that the product originates from the entity; for this purpose, sensitive information of the entity stored on the server system are used. A representation of the certification is then returned to the client system.

In the method of the invention the server system performs all the operations required to authenticate the products; in this way, the sharing of any sensitive information used to certify the origin of the products is avoided.

The devised solution increases the securing of the authentication process, thereby reducing the risks of any misuse of the sensitive information.

The method of the invention allows tracking the actual use of the sensitive information by the different authorized subjects.

Moreover, the control of the authentication process is centralized on the server computer; therefore, its management is strongly simplified.

The proposed structure makes it possible to restrict the access to the sensitive information, without involving its proliferation.

The solution according to the present invention also supports unattended authentication processes.

The preferred embodiment of the invention described above offers further advantages.

Particularly, the subject from which the request of authentication is received is verified controlling an address of the client computer.

In this way, the use of the private key can be restricted to requests coming from predefined computers.

In addition or in alternative, the method verifies whether the user logged on the client computer is authorized.

The proposed feature further increases the security of the process.

However, the solution of the present invention leads itself to be implemented even verifying only the address of the client computer or only the user from which the request is received. For example, the verification limited to the address can be implemented when the access to the client computers is strongly controlled; conversely, the verification limited to the user allows requesting the authentication of products from different locations. Alternatively, the verification of the subject from which the request is received is based on different properties; for example, the server computer can satisfy the requests only coming from the client computers of a specific department.

The solution according to the present invention is specifically designed for an authentication process involving the generation of a digital signature of the product with a private key (which is automatically retrieved on the server computer).

This application is particularly advantageous and makes it possible to provide a completely unattended process (even if the application of different authentication techniques is not excluded).

In a specific embodiment of the invention, a password for accessing the private key is passed to the signing tool as a parameter.

Alternatively, the private key is imported from a private configuration memory area of the server computer.

Both the approaches described above are very simple and flexible, but at the same time effective.

However, the method of the invention is also suitable to be implemented with different procedures for retrieving the private key. For example, in an environment wherein the access to the server computer is strongly controlled, the private key can be stored without any access password.

A way to further improve the solution is to limit the commands that can be invoked on the server computer.

This additional feature reduces the risks of any unauthorized access to the server computer (and then to the private key).

In any case, the provision of alternative security measures is envisaged.

Advantageously, the solution according to the present invention is implemented with a computer program, which is provided as a corresponding product stored on a suitable medium. The program has a client-server architecture, with different modules running on the client computer and on the server computer, respectively. Moreover, it should be noted that either the component on the client computer or the component on the server computer is suitable to be implemented and distributed separately.

Alternatively, the program is pre-loaded onto the hard-disks, is sent to the computers through a network (typically the Internet), is broadcast, or more generally is provided in any other form directly loadable into the working memories of the computers. However, the method according to the present invention leads itself to be carried out even with a hardware structure (for example, integrated in a chip of semiconductor material).

Naturally, in order to satisfy local and specific requirements, a person skilled in the art may apply to the solution described above many modifications and alterations all of which, however, are included within the scope of protection of the invention as defined by the following claims.

What is claimed is:

1. A computer program product comprising a computer readable storage device on which a computer readable program is stored, wherein the computer readable program, when executed on a data processing structure, causes the data processing structure to:
   receive a request of authentication of a product that includes a request to invoke a remote command for satisfying the request of authentication from a client system,
   verify whether the request of authentication is received from an authorized subject, and
   responsive to a positive verification that the request is received from an authorized subject:
      verify whether the remote command is included in a predefined list stored on the data processing structure, wherein the list includes at least one remote command for satisfying the request of authentication, and
      responsive to the remote command being included in the predefined list, execute the remote command by:
         certifying that the product originates from an entity having at least one authorized subject using sensitive information of the entity stored on the data processing structure, and
         returning a representation of the certification to the client system.

2. The computer program product according to claim 1, wherein the computer readable program for verifying whether the request is received from an authorized subject further causes the data processing structure to:
   compare an address of the client system with an indication of authorized addresses stored on the data processing structure.

3. The computer program product according to claim 1, wherein the computer readable program for verifying whether the request is received from an authorized subject further causes the data processing structure to:
   compare an identifier of a user logged on the client system with an indication of authorized users stored on the data processing structure.

4. The computer program product according to claim 1. wherein the computer readable program for certifying further causes the data processing structure to:
   automatically retrieve a private key of the entity stored on the data processing structure, and
   digitally signing the product using the private key.

5. The computer program product according to claim 4, wherein the computer readable program for automatically retrieving the private key further causes the data processing structure to:
   call a signing command passing a password for accessing the private key as a parameter.

6. The computer program product according to claim 4, wherein the computer readable program for automatically retrieving the private key further causes the data processing structure to:
   call a signing command with an option causing the import of the private key from a private configuration memory area of the data processing structure.

7. A data processing structure comprising:
   a processor; and
   a memory coupled to the processor, wherein the memory comprises in instructions which, when executed by the processor, cause the processor to:

receive a request of authentication of a product that includes a request to invoke a remote command for satisfying the request of authentication from a client system, verify whether the request of authentication is received from an authorized subject, and responsive to a positive verification that the request is received from an authorized subject:

verify whether the remote command is included in a predefined list stored on the data processing structure, wherein the list includes at least one remote command for satisfying the request of authentication, and responsive to the remote command being included in the predefined list, execute the remote command by:

certifying that the product originates from an entity having at least one authorized subject using sensitive information of the entity stored on the data processing structure, and returning a representation of the certification to the client system.

8. The data processing structure according to claim 7, wherein the instructions for verifying whether the request is received from an authorized subject further cause the processor to:

compare an address of the client system with an indication of authorized addresses stored on the data processing structure.

9. The data processing structure according to claim 7, wherein the instructions for verifying whether the request is received from an authorized subject further cause the processor to:

compare an identifier of a user logged on the client system with an indication of authorized users stored on the data processing structure.

10. The data processing structure according to claim 7, wherein the instructions for certifying further cause the processor to:

automatically retrieve a private key of the entity stored on the data processing structure and digitally signing the product using the private key.

11. The data processing structure according to claim 10, wherein the instructions for automatically retrieving the private key further cause the processor to:

call a signing command passing a password for accessing the private key as a parameter.

12. The data processing structure according to claim 10, wherein the instructions for automatically retrieving the private key further cause the processor to:

call a signing command with an option causing the import of the private key from a private configuration memory area of the data processing structure.

13. A data processing structure comprising:

a processor; and a memory coupled to the processor, wherein the memory comprises instructions which, when executed by the processor, cause the processor to:

receive a request of authentication of a product that includes a request to invoke a remote command for satisfying the request of authentication from a client system;

verify whether the request of authentication is received from an authorized subject; and responsive to a positive verification that the request is received from an authorized subject:

verify whether the remote command is included in a predefined list stored on the data processing structure, wherein the list includes at least one remote command for satisfying the request of authentication, and responsive to the remote command being included in the predefined list, execute the remote command by:

generating a digital signature of the product using a private key of the entity stored on the data processing structure; and returning the digital signature to the client system, wherein the digital signature certifies that the product originates from the entity.

14. A computer program product comprising a computer readable storage device on which a computer readable program is stored, wherein the computer readable program, when executed on a data processing structure, causes the data processing structure to:

receive a request of authentication of a product that includes a request to invoke a remote command for satisfying the request of authentication from a client system;

verify whether the request of authentication is received from an authorized subject; and responsive to a positive verification that the request is received from an authorized subject:

verify whether the remote command is included in a predefined list stored on the data processing structure, wherein the list includes at least one remote command for satisfying the request of authentication, and responsive to the remote command being included in the predefined list, execute the remote command by:

generating a digital signature of the product using a private key of the entity stored on the data processing structure; and returning the digital signature to the client system, wherein the digital signature certifies that the product originates from the entity.

\* \* \* \* \*